US008918779B2

(12) United States Patent
Nichols et al.

(10) Patent No.: US 8,918,779 B2
(45) Date of Patent: Dec. 23, 2014

(54) LOGICAL MIGRATION OF APPLICATIONS AND DATA

(75) Inventors: David A. Nichols, Redmond, WA (US); Navjot Virk, Sammamish, WA (US); Samuel J. McKelvie, Seattle, WA (US); Mathew J. Dickson, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1052 days.

(21) Appl. No.: 12/548,619

(22) Filed: Aug. 27, 2009

(65) Prior Publication Data

US 2011/0055823 A1    Mar. 3, 2011

(51) Int. Cl.
*G06F 9/44* (2006.01)
*G06F 9/445* (2006.01)

(52) U.S. Cl.
CPC .................................. *G06F 9/4451* (2013.01)
USPC ........... 717/174; 717/168; 717/169; 717/170; 717/171; 717/172; 717/173; 717/175; 717/176; 717/177

(58) Field of Classification Search
None
See application file for complete search history.

(56) References Cited

U.S. PATENT DOCUMENTS

| | | | |
|---|---|---|---|
| 6,442,663 B1 | 8/2002 | Sun et al. | |
| 6,934,755 B1 | 8/2005 | Saulpaugh et al. | |
| 6,963,908 B1* | 11/2005 | Lynch et al. | 709/220 |
| 7,065,549 B2 | 6/2006 | Sun et al. | |
| 7,210,131 B2 | 4/2007 | Schmidt et al. | |
| 7,246,224 B2 | 7/2007 | Rothman et al. | |
| 7,383,405 B2 | 6/2008 | Vega et al. | |
| 2004/0044998 A1* | 3/2004 | Wildhagen et al. | 717/170 |
| 2005/0235270 A1 | 10/2005 | Sanyal | |
| 2006/0026195 A1 | 2/2006 | Gu et al. | |
| 2007/0168478 A1 | 7/2007 | Crosbie | |
| 2007/0220503 A1* | 9/2007 | Fan et al. | 717/168 |
| 2008/0155526 A1* | 6/2008 | Gokhale | 717/169 |
| 2008/0222638 A1 | 9/2008 | Beaty et al. | |
| 2009/0088142 A1* | 4/2009 | Baribault et al. | 455/418 |
| 2009/0144721 A1* | 6/2009 | Wagner et al. | 717/172 |
| 2010/0131625 A1* | 5/2010 | Dehaan et al. | 709/221 |
| 2010/0269164 A1* | 10/2010 | Sosnosky et al. | 726/7 |
| 2010/0281458 A1* | 11/2010 | Paladino et al. | 717/106 |
| 2010/0287263 A1* | 11/2010 | Liu et al. | 709/221 |

OTHER PUBLICATIONS

Chanchio, et al., "SNOW: Software Systems for Process Migration in High-Performance, Heterogeneous Distributed Environments", retrieved on Jan. 7, 2009 at <<http://ieeexplore.ieee.org/stamp/stamp.jsp?arnumber=01039781>>, Proceedings of the International Conference on Parallel Processing Workshops (ICPPW 2002), 8 pages.

* cited by examiner

*Primary Examiner* — Kris Rhu
(74) *Attorney, Agent, or Firm* — Bryan Webster; Kate Drakos; Micky Minhas (57) ABSTRACT

Implementations are described of a computing device that migrates data and software applications from a first computing device to a second computing device, in order to preserve data and other application-related customizations.

20 Claims, 4 Drawing Sheets

LOGICAL MIGRATION OF APPLICATIONS AND DATA

BACKGROUND

Migration of applications and data from an existing computing device or system to a new computing device or system includes backing up of files, documents, personalized settings, customized environments, and the like, to preserve data and customizations to applications. During the migration of the applications and the data, complications may interfere with the attempt to preserve data and customizations to applications.

When the applications are migrated to the new computing device or system, migration may not account for personalized settings, customizations, and other old data from the existing computing device or system. Therefore, the quality of the new applications to be installed may be compromised. For example, a version incompatibility and different customized settings present in the previous or existing computing device or system may affect the performance of the new application(s) installed in the new computing device or system. In addition, backing up of files, documents, and the like to preserve data and customizations to applications may include a great deal of time and effort on the part of a user.

SUMMARY

The following presents a simplified summary in order to provide a basic understanding of some aspects of the disclosed subject matter. This summary is not an extensive overview of the disclosed subject matter, and is not intended to identify key/critical elements or to delineate the scope of such subject matter. A purpose of the summary is to present some concepts in a simplified form as a prelude to the more detailed description that is presented later.

In an implementation, a server includes an online service that includes software library and data storage. The server is linked to a software/applications manufacturer, such that the server acts as a proxy to clients. In other implementations, the server installs the applications onto a client by determining compatible installation versions for the applications. In addition, the server provides customized setting selections to the client, and backing up of files, documents, and the like, to preserve an end-user environment. The end-user environment includes desired settings, customizations, files, and documents to be maintained by the end-user in a new computing device.

To the accomplishment of the foregoing and related ends, certain illustrative aspects are described herein in connection with the following description and the annexed drawings. These aspects are indicative of various ways in which the disclosed subject matter may be practiced, all of which are intended to be within the scope of the disclosed subject matter. Other advantages and novel features may become apparent from the following detailed description when considered in conjunction with the drawings.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

This disclosure is directed towards systems and methods for implementing logical migration of applications and data between computing devices or clients, and between a client(s) and an original equipment manufacturer (OEM). The migration of the applications and the data can use a cloud server that serves as a proxy to software/applications manufacturers. In an implementation, the cloud server includes software library component that stores software applications supplied by the software/applications manufacturer. The cloud server can include data storage that stores client's data, such as extracted files, documents, settings, customized environment, and version or names of previously installed software applications. In other implementations, where a user procures a new computing device, the cloud server supplies the saved files, documents, settings, customizations, and the like, to the OEM. To this end, a user-environment can be preserved in the new computing device by the OEM.

Figure 1:
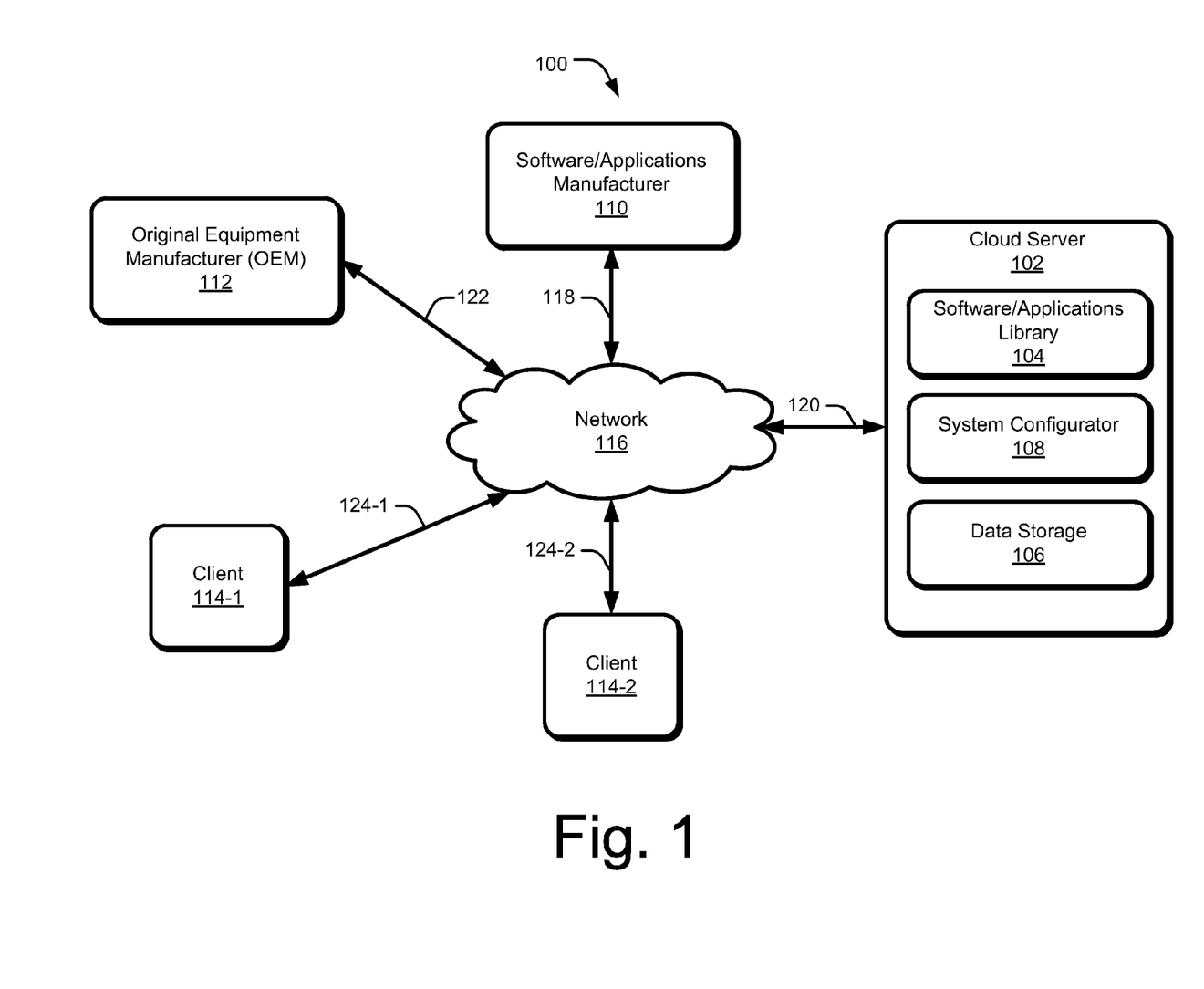
FIG. 1 is a block diagram of a network environment that includes a cloud server.

FIG. 1 is a block diagram of an exemplary network environment 100 that includes a server or a cloud server 102. The cloud server 102 can include a software/applications library component 104, data storage component 106, and system configurator component 108. The cloud server 102 connects with software/applications manufacturer 110, original equipment manufacturer (OEM) 112, client 114-1, and client 114-2, through a network 116 (e.g., internet, extranet, intranet). The clients 114-1 and 114-2 (collectively referred to as clients 114) can include one or more computing devices or systems.

The cloud server 102 can include one or more independent online server computer systems or computing devices (e.g., servers), also known as nodes, working together as a single system to ensure that applications and data are available to clients, such as the client 114-1 (a first computing device) and the client 114-2 (a second computing device). The one or more independent online server computer systems can include a component or a program that responds to commands from the clients 114. In an implementation, the cloud server 102 installs software applications to the clients 114 or provides the software applications to the OEM 112.

The cloud server 102 can store the software applications in the software/applications library component 104. The software applications can be supplied by the software/applications manufacturer 110, or the software applications can include pre-stored software applications in the software/applications library component 104. The pre-stored software applications can include those software applications that were originally stored on the cloud server 102. To this end, the cloud server 102 can act as a proxy to the software/applications manufacturer 110.

In an implementation, the software applications supplied by the software/applications manufacturer 110, through the network 116, include a first set of software applications stored in the software/applications library component 104. The first set of software applications includes computer programs such as system software, applications software, network software, and the like. The first set of software applications includes at least one of the software applications that were pre-stored or pre-existing in the software/applications library component 104, the software applications supplied by the software/applications manufacturer 110, or the software applications supplied by other sources (e.g., software applications that are supplied by the OEM 112). As further discussed below, the first set of software applications includes updates in the software applications supplied by the software/applications manufacturer 110 that can be integrated with recent data extracted from a source (e.g., client 114-1).

The cloud server 102 includes the data storage component 106 that stores clients 114 data, such as files, documents, settings, customizations, versions and/or names of previously installed software applications, and the like. The settings can include scheduled computer maintenance, screen saver, speaker settings, and the like. The customizations can include modifications in hardware or software to suit the needs or preferences of the clients 114. The versions and/or names of the previously installed software applications can include the software applications versions that were already existing or installed from a source computing device. For example, the source computing device (e.g., client 114-1) contains a 2009 version of a particular software application. The 2009 version is the version and/or name (of the software application) that is identified or referred to in the stored clients 114 data.

In the implementation just described, the versions and/or names of the software applications extracted from the first computing device (i.e., client 114-1), can be a second set of software applications. The second set of software applications can include the versions and/or names of system software, applications software, network software, and the like, that were installed in the first computing device (i.e., client 114-1). The second set of software applications are identified by the cloud server 102 and stored in the data storage component 106 for future use or reference by the clients 114. In certain implementations, the second set of software applications are used as a reference by the cloud server 102 for the migration of data and applications to the target computing device (e.g., client 114-2 or OEM 112).

The cloud server 102 can be configured to extract data bits (or periodically extract updates on data bits) that define the files, documents, settings, customizations, and the second set of software applications. These data bits can be stored on the data storage component 106 for future use or transfer to the second computing device (i.e., client 114-2). In an implementation, a new software application is configured by the cloud server 102 to be installed onto the second computing device (i.e., client 114-2). The new software application(s) to be installed in the second computing device (i.e., client 114-2) is referred to as a third set of software applications.

The third set of software applications can include at least one of the first set of software applications, or the first set of software applications that adopts the data bits stored in the data storage component 106 (e.g., settings, customizations, or the second set of software applications). In an implementation, the installation of the third set of software applications includes the desired settings, customization, files, documents, and the like, that are selected by a user or end user from the data stored in the data storage component 106. In certain implementation, a selection of one or more third set of software applications is offered to the end-user by integrating the updates in the first set of software applications with the data extracted from the first computing device (i.e., client 114-1). The selection of one or more third set of software applications can provide the end-user a capability to delete the migrated applications and data onto the second computing device, and request another third set of software applications from the cloud server 102 to be re-installed.

In certain implementations, the cloud server 102 installs the third set of software applications to the target computing device (e.g., client 114-2, EOM 112) and at the same time preserves the source computing device (e.g., client 114-1) environment. In other words, if the end-user wants to retain all the settings and customizations existing in the first computing device to a new computing device (e.g., client 114-2) that the end-user is about to purchase, then the end-user can request the cloud server 102 to install the third set of software applications together with the settings and customizations that were extracted from the first computing device. The cloud server 102 further provides accessibility of setting selections and customization selections to the end-user so that the end-user can return to previous settings and customizations when desired. The setting selections and the customization selections include the settings and the customizations that are stored on the data storage component 106.

An installation version can be determined by the cloud server 102 to install the third set of software applications. The installation version can be compatible with the third set of software applications to be installed in the target computing device (e.g., client 114-2, OEM 112). In an implementation, the cloud server 102 is configured to determine the installation version that is defined or based upon at least one of the first set of software applications, the second set of software applications, or the data that the end-user wants to maintain when installing the third set of software applications. For example, the end-user of the first computing device (i.e., client 114-1) wants to install a version of a particular software application onto the second computing device (i.e., client 114-2). To this end, the cloud server 102 can provide the installation version that is compatible with the installation of the particular software application. In other words, the cloud server 102 is configured to determine the installation version based upon a request of the end-user. If the end-user wants to install the particular software application, then the cloud server 102 uses the installation version for installing the particular software application. If the end-user wants to retain the settings and the customizations from the first computing device when installing the particular software application, then the cloud server 102 is configured to use the installation version that takes into account the settings and the customizations of the first computing device.

The cloud server 102 can be further configured to keep track of changes in the first set of software applications, and adopts a database in the software/applications library component 104 for all these changes in the first set of software applications. The changes can include updated versions of the first set of software applications such as, for example, changes when upgrading from older version to newer version. In an implementation, the cloud server 102 is configured to integrate the changes in the first set of software applications with the data stored in the data storage component 106. This integration can result to the third set of software applications that can be installed by the cloud server 102 to the target computing device such as client 114-2. To this end, the cloud server 102 is configured to determine the installation version that is compatible with the integration result (i.e., third set of software applications).

The system configurator component 108 can include a processing unit (not shown) that acts as a control unit for application installation system of the network environment 100. The application installation system is a process of migrating the applications and data (e.g., requested settings and customizations) by the cloud server 102 to the target computing device such as the client 114-2. The system configurator component 108 can be configured to integrate communications between the client 114-1, the client 114-2, software/applications manufacturers 110, and the OEM 112. In an implementation, the system configurator component 108 is configured to extract the data from the client 114-1; store the data into the data storage component 106; upload the first set of software applications to the software/applications library component 104; request or receive the updates from the software/applications manufacturer 110; determine or identify the second set of software applications (i.e., versions and/or names) installed in the client 114-1; determine the compatible installation versions for installing the third set of software applications to the client 114-2; and receive a request for the migration of the applications and data from the client 114-1.

In another implementation, the system configurator component 108 can be configured to provide access to the data stored in the data storage component 106 to preserve the client 114-1 environment. The client 114-1 environment can include the settings and customizations that the client 114-1 wants to maintain in the second computing device (e.g., client 114-2). In certain implementations, the third set of software applications or a subset of the third set of software applications is selected by the end-user. Furthermore, additional customizations to the computing environment of the client 114-2 can be selected by the end-user during migration. For example, if the end-user wants to upgrade the setting selections in the second computing device, then the end-user can access the data from the data storage component 106.

The software/applications manufacturer 110 includes designers and developers of computer programs used by the clients 114. The software/applications manufacturer 110 can link to the cloud server 102 through the network 116 for distribution of the computer programs and other similar products. In an implementation, the software/applications manufacturer 110 does not need to keep track of proper installation versions that fit the settings, customizations, and the like, as desired by the client 114-1. The cloud server 102 can perform such functions. The software/applications manufacturer 110 can communicate with the cloud server 102 through a communication path 118 connected to the network 116. The communication path 118 transmits the software applications from the software/applications manufacturer 110, and the software applications are received by the cloud server 102 through a communication path 120. In certain implementations, the communication path 120 is used by the cloud server 102 to request the updates from the software/applications manufacturer 110.

The OEM 112 includes manufacturers of the clients 114 and such other computing devices. In an implementation, the OEM 112 can request and receive migration of the applications and data from the cloud server 102. In another implementation, the OEM provides the migration of the applications and the data to the second computing device (i.e., client 114-2) as the target computing device. The OEM 112 can communicate with the cloud server 102 through a communication path 122. The communication path 122 can transmit the applications and data to or from the cloud server 102. The application and data to or from the communication path 122 is linked by the network 116 before passing through the communication path 120 in the cloud server 102.

In an implementation, the second computing device (client 114-2) is manufactured (i.e., provided) by the OEM 112. The client 114-2 can be also manufactured (i.e., provided) by a manufacturer which partially manufactures the client 114-2, i.e., the manufacturer acquires some components from another manufacturer or vendor. In another implementation, the client 114-2 is provided by a seller or reseller of the client 114-2. The client 114-2 can also be entirely controlled by the end-user of the client 114-2. One skilled in the art will recognize that the client 114-1 or the client 114-2 can be controlled and altered by a variety of entities, before becoming entirely controlled by the end-user. Furthermore, each of the entities can play a role in migrating data and software applications. For example, a particular software application has already been installed by the OEM 112 in the second computing device. To this end, upgrade for the particular software application can be further installed by the cloud server 102.

Clients 114 can include one or more remote computing devices such as a personal computing device, a server, a router, a network personal computer (PC), and the like. Clients 114 include the client 114-1 and the client 114-2. In an implementation, the client 114-1 sends a request for data migration through a communication path 124-1. The request passes through the network 116 and is received by the cloud server 102 through the communication path 120. The cloud server 102 installs the third set of software applications that passes through the communication path 120, the network 116 and are received by the client 114-2 through a communication path 124-2. In addition, the cloud server 102 migrates the data (e.g., customizations, settings), which are to be maintained at the client 114-2.

The network 116 connects the software/applications manufacturer 110, OEM 112, and clients 114 to the cloud server 102. In an implementation, the network 116 is configured to migrate the applications and data between the clients 114. The network 116 includes intranets, extranets, and Internet.

Figure 2:
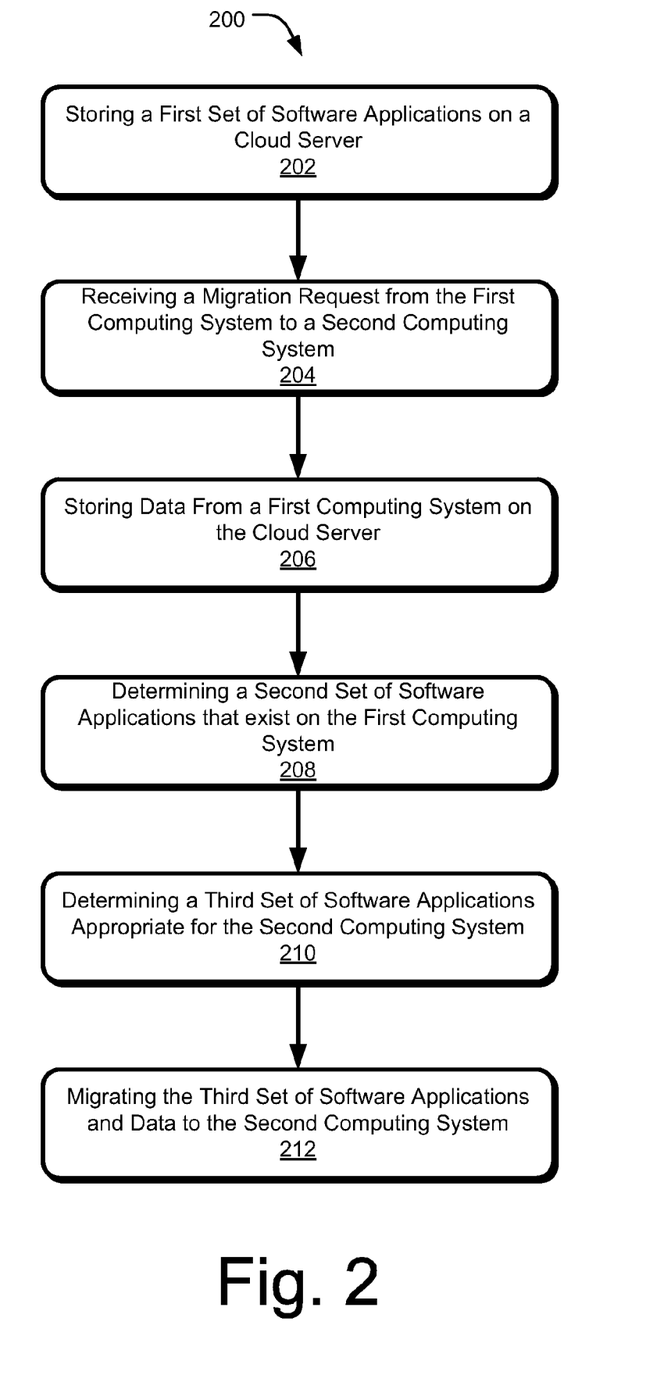
FIG. 2 is a flow chart diagram for implementing logical migration of applications and data in the cloud server.

FIG. 2 illustrates an exemplary method 200 for logical migration of applications and data. In one implementation, the exemplary method 200 can be implemented in a network environment 100. The order in which the method is described is not intended to be construed as a limitation, and any number of the described method blocks can be combined in any order to implement the method, or alternate method. Additionally, individual blocks can be deleted from the method without departing from the spirit and scope of the subject matter described herein. Furthermore, the method can be implemented in any suitable hardware, software, firmware, or a combination thereof, without departing from the scope of the invention.

At block 202, storing software applications is performed. For example, a server (e.g., cloud server 102) is configured to store a first set of software applications supplied by software/applications manufacturer (e.g., software/applications manufacturer 110). As discussed above, the cloud server 102 acts as a proxy to the software/applications manufacturer 110 by storing the software applications in a software/applications library component (e.g., software/applications library component 104). In addition, the cloud server 102 can request for periodic updates to the first set of software applications from the software/applications manufacturer 110 through a network (e.g., network 116). In other implementations, the first set of software applications are pre-existing in the software/applications library component 104, or supplied by other software applications sources.

At block 204, receiving a request for migration of applications and data is performed. For example, an end-user operates or controls the first computing device (e.g., client 114-1) and the second computing device (e.g., client 114-2). When the cloud server (e.g., cloud server 102) receives the request to migrate applications and data from the first computing device (e.g., client 114-1), a system configurator component (e.g., system configurator component 108) analyzes and determines a computing environment for the second computing device (e.g., client 114-2). In an implementation, the computing environment includes hardware and software setup as desired by the end-user to be installed in the second computing device (e.g., client 114-2), and compatibility of new operating systems of the second computing device to the data in the first computing device.

At block 206, storing client data is performed. In an implementation, the server (e.g., cloud server 102) extracts the client data of the first computing device (i.e., client 114-1) through a network (e.g., network 116). The cloud server 102 saves the client data of the first computing device (e.g., client 114-1) into data storage (e.g., data storage component 106). The client data can include client files, documents, versions and/or names of software applications installed, settings, customizations, intermediate settings, etc. The versions and/or names of the software applications installed is referred to as a second set of software applications that can be used as a reference for installation of a third set of software applications to the second computing device (i.e., client 114-2).

At block 208, determining the versions and/or names of the software applications existing in the client data is performed. In an implementation, as discussed above, the system configurator (e.g., system configurator component 108) determines and identifies the second set of software applications that includes the versions and/or names of the software applications installed in the first computing device (e.g., client 114-1).

At block 210, determining software applications to be installed in the client is performed. In an implementation, as discussed above, the system configurator component 108 is configured to provide the third set of software applications that includes at least one of the first set of software applications, or the first set of software applications that adopts the data bits stored in the data storage component 106 (e.g., settings, customizations, second set of software applications, etc.). In another implementation, the system configurator component 108 informs the client (e.g., client 114-1) that the customizations, settings, and other data, were not integrated into the third set of software applications. To this end, the client 114-1 is given options of retaining original version of the second set of software applications, or upgrading to a different version as stored in the software/applications library component 104. In certain implementations, the system configurator component 108 migrates a subset of data and customizations to the second computing device (e.g., client 114-2), while retaining the original data and customizations in the cloud server 102. In other words, the end-user can recover data and customizations that can be lost during the migration.

At block 212, migrating and installing the applications and data is performed. In an implementation, as discussed above, the server or cloud server 102 installs the third set of software applications to the second computing device (e.g., client 114-2) and correspondingly preserves the computing environment of the first computing device (e.g., client 114-1). In another implementation, the cloud server 102 can periodically extract and back up the data of the clients 114. The periodic extraction of the client data can be based from at least one of the following: client request (e.g., client 114-1), predetermined period as configured in the system configurator component 108, or the presence of updates in the first set of software applications. In certain implementation, the most recent applications, data, and customizations, can be backed up to the cloud server 102 before the system configurator component 108 can begin the installation process.

Figure 3:
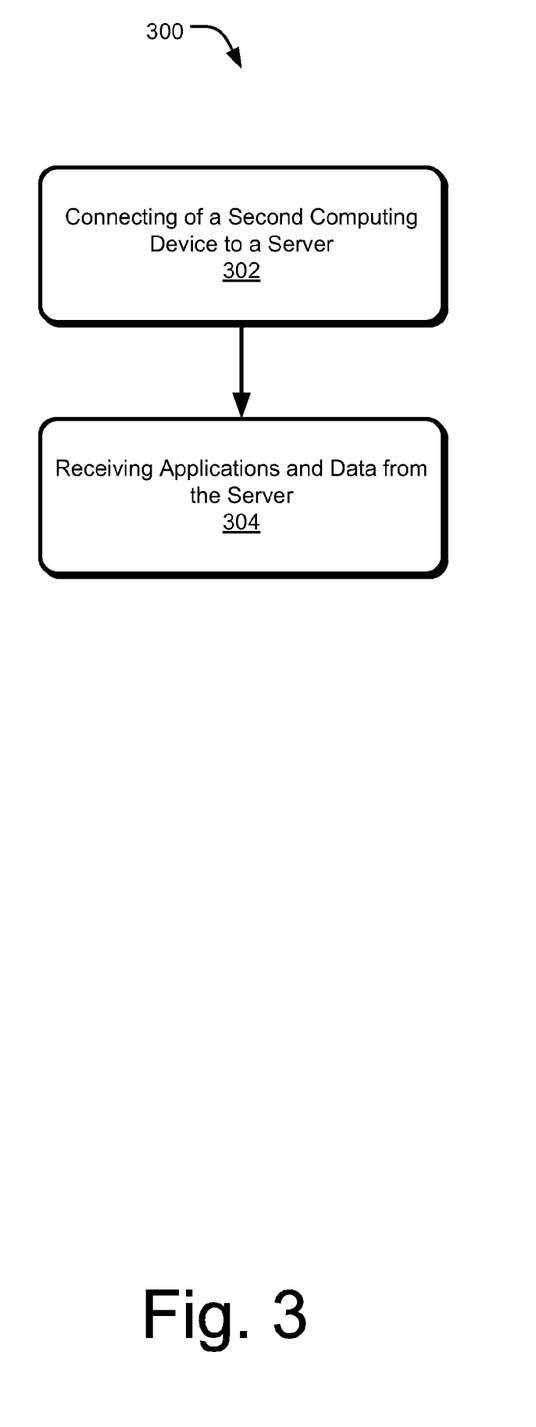
FIG. 3 is a flow chart diagram for implementing logical migration of applications and data in a second computing device.

FIG. 3 is a flow chart diagram 300 for migrating applications and data to a second computing device. In an implementation, the applications and data from a first computing device are migrated to the second computing device. In other implementations, the applications and data stored in a server are migrated to the second computing device. The order in which the method is described is not intended to be construed as a limitation, and any number of the described method blocks can be combined in any order to implement the method, or alternate method. Additionally, individual blocks can be deleted from the method without departing from the spirit and scope of the subject matter described herein. Furthermore, the method can be implemented in any suitable hardware, software, firmware, or a combination thereof, without departing from the scope of the invention.

At block 302, connecting of the second computing device to a server is performed. In an implementation, where the applications and data from the first computing device (i.e., client 114-1) are migrated to the second computing device (i.e., client 114-2), the second computing device is linked to a server or cloud server (e.g., cloud server 102). As discussed above, the cloud server 102 can be configured to act as proxy to software/applications manufacturer, or to store data for future reference or use by an end-user.

At block 304, receiving applications and data from the server is performed. In an implementation, the cloud server 102 installs the applications (e.g., third set of software applications) and data from a data storage component (e.g., data storage component 106) onto the second computing device (e.g., client 114-2). In other implementations, recent data from the first computing device is integrated with updates in the first set of software applications before migration of the applications and data is performed by the cloud server 102.

Figure 4:
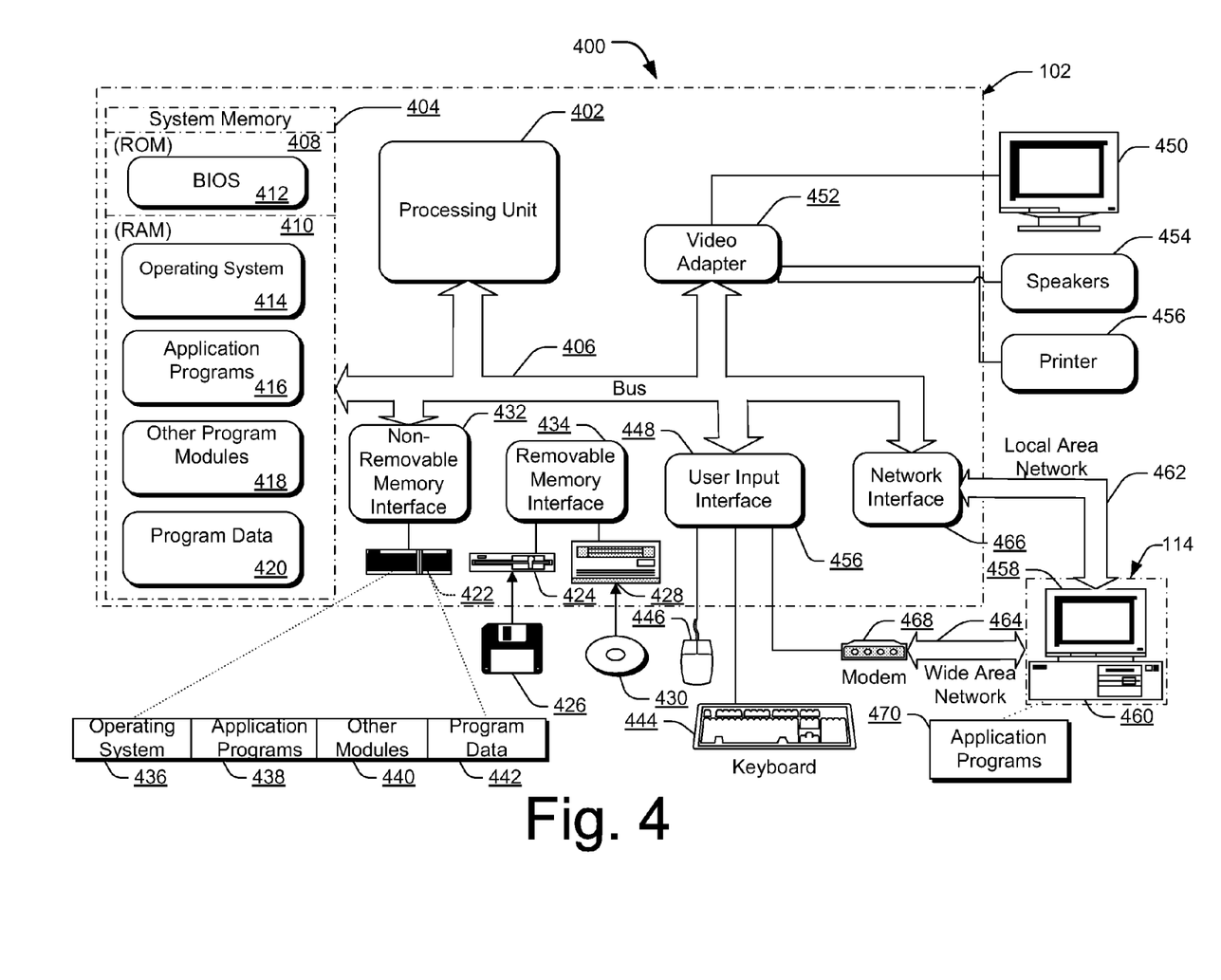
FIG. 4 is a block diagram of an exemplary server or computing device environment for practicing the subject matter.

FIG. 4 shows an exemplary computing device 400 implemented as the cloud server 102 suitable as an environment for practicing aspects of the subject matter, for example to upload software into software/applications library component 104. The components of cloud server 102 can include, but are not limited to, a processing unit 402, a system memory 404, and a system bus 406 that couples various system components including the system memory 404 to the processing unit 402. The system bus 406 can be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as the Mezzanine bus.

Exemplary cloud server 102 typically includes a variety of computing device-readable media. Computing device-readable media can be any available media that can be accessed by cloud server 102 and includes both volatile and nonvolatile media, removable and non-removable media. By way of example, and not limitation, computing device-readable media can comprise computing device storage media and communication media. Computing device storage media include volatile and nonvolatile, removable and non-removable media implemented in any method or technology for storage of information such as computing device-readable instructions, data structures, program modules, or other data. Computing device storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by cloud server 102. Communication media typically embodies computing device-readable instructions, data structures, program modules or other data in a modulated data signal such as a carrier wave or other transport mechanism and includes any information delivery media. The term "modulated data signal" can include a signal that has one or more of its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computing device readable media.

The system memory 404 includes computing device storage media in the form of volatile and/or nonvolatile memory such as read only memory (ROM) 408 and random access memory (RAM) 410. A basic input/output system 412 (BIOS), containing the basic routines that help to transfer information between elements within, such as during start-up, is typically stored in ROM 408. RAM 410 typically contains data and/or program modules that are immediately accessible to and/or presently being operated on by processing unit 402. By way of example, and not limitation, FIG. 4 illustrates operating system 414, application programs 416, other program modules 418, and program data 420. Although the exemplary cloud server 102 can be depicted as software in random access memory 410, other implementations of an exemplary cloud server 102 can be hardware or combinations of software and hardware.

The exemplary cloud server 102 can also include other removable/non-removable, volatile/nonvolatile computing device storage media. By way of example only, FIG. 4 illustrates a hard disk drive 422 that reads from or writes to non-removable, nonvolatile magnetic media, a magnetic disk drive 424 that reads from or writes to a removable, nonvolatile magnetic disk 426, and an optical disk drive 428 that reads from or writes to a removable, nonvolatile optical disk 430 such as a CD ROM or other optical media. Other removable/non-removable, volatile/nonvolatile computing device storage media that can be used in the exemplary operating environment include, but are not limited to, magnetic tape cassettes, flash memory cards, digital versatile disks, digital video tape, solid state RAM, solid state ROM, and the like. The hard disk drive 422 can be connected to the system bus 406 through a non-removable memory interface such as interface 432, and magnetic disk drive 424 and optical disk drive 428 are typically connected to the system bus 406 by a removable memory interface such as interface 434.

The drives and their associated computing device storage media discussed above and illustrated in FIG. 4 provide storage of computing device-readable instructions, data structures, program modules, and other data for cloud server 102. In FIG. 4, for example, hard disk drive 422 can be illustrated as storing operating system 436, application programs 438, other program modules 440, and program data 442. Note that these components can either be the same as or different from operating system 414, application programs 416, other program modules 418, and program data 420. Operating system 436, application programs 438, other program modules 440, and program data 442 are given different numbers here to illustrate that, at a minimum, they are different copies. A user or administrator can enter commands and information into the exemplary cloud server 102 through input devices such as a keyboard 444 and pointing device 446, commonly referred to as a mouse, trackball, or touch pad. Other input devices (not shown) can include a microphone, joystick, game pad, satellite dish, scanner, or the like. Other input devices can be connected to the processing unit 402 through a user input interface 448 that is coupled to the system bus, but can be connected by other interface and bus structures, such as a parallel port, game port, or a universal serial bus (USB). A monitor 450 or other type of display device can also be connected to the system bus 406 via an interface, such as a video interface 452. In addition to the monitor 450, computing devices can also include other peripheral output devices such as speakers 454 and printer 456.

The exemplary cloud server 102 can operate in a networked environment using logical connections to one or more remote computing devices, such as a remote computing device 458. The remote computing device 458 can be a personal computing device, a server, a router, a network PC, a peer device or other common network node, and typically includes many or all of the elements described above relative to cloud server 102, although only a memory storage device 460 has been illustrated in FIG. 4. A client 114 as depicted in FIG. 1 can include the remote computing device 458 and the memory storage device 460. The logical connections depicted in FIG. 4 can include a local area network (LAN) 462 and a wide area network (WAN) 464, which are examples of network 116 connections. Such networking environments are commonplace in offices, enterprise-wide computing device networks, intranets, and the Internet.

When used in a LAN networking environment, the exemplary cloud server 102 can be connected to the LAN 462 through a network interface or adapter 466. When used in a WAN networking environment, the exemplary cloud server 102 typically includes a modem 468 or other means for establishing communications over the WAN 464, such as the Internet. The modem 468, which can be internal or external, can be connected to the system bus 406 via the user input interface 448, or other appropriate mechanism. In a networked environment, program modules depicted relative to the exemplary cloud server 102, or portions thereof, can be stored in the remote memory storage device. By way of example, and not limitation, FIG. 4 illustrates remote application programs 470 as residing on memory device 460. It will be appreciated that the network connections shown are exemplary and other means of establishing a communications link between the computing devices can be used.

It should be noted that the subject matter described above can be implemented in hardware, in software, or in both hardware and software. In certain implementations, the exemplary system, engine, and related methods can be described in the general context of computer-executable instructions, such as program modules, being executed by a television set-top box and/or by a computer. Generally, program modules include routines, programs, objects, components, data structures, etc. that performs particular tasks or implement particular abstract data types. The subject matter can also be practiced in distributed communications environments where tasks are performed over wireless communication by remote processing devices that are linked through a communications network. In a wireless network, program modules can be located in both local and remote communications device storage media including memory storage devices.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims. For example, the systems described could be configured as networked communication devices, computing devices, and other electronic devices.

What is claimed is:

1. A server comprising:
a software library component configured to store a first set of software applications, wherein the first set of software applications includes software applications supplied by software applications manufacturers, and software applications that were previously stored on the software library component;
a data storage component configured to extract and store data from a first computing device in response to detecting a presence of updates in the first set of software applications, wherein the data include files, documents, settings, customizations and versions of software applications installed on the first computing device; and
a system configurator component configured to:
determine a second set of software applications that includes the versions of the software applications installed on the first computing device from the data storage component,
determine an installation version for a third set of software applications for a second computing device, wherein the installation version is compatible with the third set of software applications and is further compatible with an operating system of the second computing device, and the third set of software applications comprises one or more software applications of the first set of software applications that have been integrated with the data stored in the data storage component prior to installing the third set of software applications to the second computing device, and
install at least a portion of the data and the third set of software applications to the second computing device, wherein the installing of the at least portion of the data includes setting selections and customization selections of the second computing device and the third set of software applications includes a version newer than the second set of software applications.

2. The server of claim 1, wherein the server comprises a cloud server that acts as a proxy to the software applications manufacturers.

3. The server of claim 1, wherein the server includes one or more independent online server computer systems or computing devices.

4. The server of claim 1, wherein the server is further configured to provide a selection of one or more software applications with corresponding setting selections and customization selections.

5. The server of claim 1, wherein the data storage component is further configured to extract and store the data in a periodic basis.

6. The server of claim 1, wherein the system configurator component determines the installation version based further on consideration of hardware and software setup as desired by a user to be installed on the second computing device.

7. The server of claim 1, wherein the system configurator component is further configured to track changes in the first set of software applications and adopt the changes when configuring the installation version for installing the third set of software applications.

8. The server of claim 1, wherein the system configurator component is further configured to integrate updates in the first set of software applications with the stored data in the data storage component to provide the third set of software applications.

9. A method comprising:
under control of one or more computing devices configured with executable instructions:
storing a first set of software applications on a software library component;
storing data from a first computing device to a data storage component in response to detecting a presence of updates in the first set of software applications, wherein the data includes files, documents, settings, customizations and versions of software applications installed on the first computing device;
determining a second set of software applications, wherein the second set of software applications includes the versions of the software applications stored on the data storage component;
determining an installation version for a third set of software applications for a second computing device; and
installing the data and the third set of software applications onto the second computing device.

10. The method of claim 9, wherein storing the first set of software applications provides a software library that includes one or more software applications.

11. The method of claim 9, further comprising receiving a request to migrate the software applications and the data of the first computing device, the request including migrating one or more of: the settings, the customizations, the files and the documents.

12. The method of claim 9, wherein storing the data further includes periodic extraction of data updates from the first computing device.

13. The method of claim 9 further comprising integrating the updates in the first set of software applications with the stored data on the data storage component.

14. The method of claim 9, wherein the installation version is compatible to the first set of software applications stored in the software library component or the first set of software applications that has adopted the data stored in the data storage component.

15. The method of claim 9, wherein determining the installation version for the third set of software applications comprises determining the installation version based at least in part on one or more of the first set of software applications and the second set of software applications.

16. A system comprising:
one or more processors;
memory;
a software library component stored in the memory and executable by the one or more processors that is configured to store a first set of software applications;
a data storage component stored in the memory and executable by the one or more processors that is configured to store data from a first computing device in response to detecting a presence of updates in the first set of software applications, wherein the data includes one or more of: files, documents, settings, customizations and versions of software applications installed on the first computing device; and
a system configurator component stored in the memory and executable by the one or more processors that is configured to:
determine a second set of software applications, wherein the second set of software applications includes the versions of the software applications stored on the data storage component;
determine an installation version for a third set of software applications for a second computing device; and install the data and the third set of software applications onto the second computing device.

17. The system of claim 16, wherein the system configurator component determines the installation version based at least in part on consideration of hardware and software setup as desired by a user of the second computing device to be installed on the second computing device.

18. The system of claim 16, wherein the system configurator component determines the installation version based at least in part on one or more of the first set of software applications and the second set of software applications.

19. The system of claim 16, wherein the system configurator component is further configured to track changes in the first set of software applications and adopt the changes when configuring the installation version for installing the third set of software applications.

20. The system of claim 16, wherein the system configurator component is further configured to receive a request to migrate the applications and the data of the first computing device, the request including migrating previous settings, customizations, files, documents, and the second set of software applications stored on the data storage component to the second computing device.

* * * * *